(12) United States Patent
Hayes (10) Patent No.: US 9,822,044 B2
(45) Date of Patent: Nov. 21, 2017

(54) UREASE INHIBITOR FORMULATIONS

(71) Applicant: Agxplore International, Parma, MO (US)

(72) Inventor: Paul Hayes, Risco, MO (US)

(73) Assignee: AgXplore International, Inc., Parma, MO (US)

( * ) Notice: Subject to any disclaimer, the term of this patent is extended or adjusted under 35 U.S.C. 154(b) by 0 days.

(21) Appl. No.: 14/609,062

(22) Filed: Jan. 29, 2015

(65) Prior Publication Data

US 2015/0218060 A1 Aug. 6, 2015

Related U.S. Application Data

(60) Provisional application No. 61/934,984, filed on Feb. 3, 2014.

(51) Int. Cl.
*C05G 3/08* (2006.01)
*C05C 9/00* (2006.01)
*C05C 11/00* (2006.01)

(52) U.S. Cl.
CPC .............. *C05G 3/08* (2013.01); *C05C 9/00* (2013.01); *C05C 11/00* (2013.01); *Y02P 60/218* (2015.11)

(58) Field of Classification Search
CPC .. C05G 3/08; C05C 9/00; C05C 11/00; C09K 15/324
USPC .................................. 71/27–28; 252/400.22
See application file for complete search history.

(56) References Cited

U.S. PATENT DOCUMENTS

| | | | |
|---|---|---|---|
| 4,530,714 A | 7/1985 | Kolc et al. | |
| 6,057,355 A | 5/2000 | Haas et al. | |
| 6,315,807 B1 | 11/2001 | Patra et al. | |
| 2002/0002933 A1 | 1/2002 | Yezrielev et al. | |
| 2011/0233474 A1 | 9/2011 | Cigler | |
| 2013/0145806 A1 | 6/2013 | Iannotta et al. | |
| 2014/0090432 A1* | 4/2014 | McKnight | C05G 3/0041 71/28 |

FOREIGN PATENT DOCUMENTS

WO  WO 2013/121384 A2  8/2013

OTHER PUBLICATIONS

Written Opinion of the International Searching Authority, dated Apr. 9, 2015. PCT/US2015/013571.
Maria Font et al., "Structural Characteristics of Phosphoramide Derivatives as Urease Inhibitors. Requirements for Activity." J. Agric. Food Chem. 2008, 56, 8451-8460 8451.
Summary of US EPA Regulations: Agriculture: Laws and Regulations that Apply to Your Agricultural Operation by Farm Activity.

\* cited by examiner

*Primary Examiner* — Jennifer A Smith
(74) *Attorney, Agent, or Firm* — Maxwell J. Petersen; Lewis Brisbois Bisgaard & Smith LLP (57) ABSTRACT

The present disclosure provides a liquid composition, comprising a dialkylcarbonate, and one or more phosphoric triamide compounds. Also provided is a liquid composition, comprising a $C_1$-$C_4$ alcohol, a vegetable oil or petroleum distillate, a surfactant, and one or more phosphoric triamide compounds. A further aspect of the disclosure provides a method for treating a nitrogen-containing fertilizer, comprising contacting a nitrogen-containing fertilizer with the liquid compositions described herein.

14 Claims, 1 Drawing Sheet

UREASE INHIBITOR FORMULATIONS

CROSS-REFERENCE

The present application claims the benefit of the filing date under 35 §U.S.C. 119 of U.S. Provisional Patent Application Ser. No. 61/934,984, entitled "Urease Inhibitor Formulations," filed Feb. 3, 2014, the disclosure of which is incorporated herein by reference in its entirety.

TECHNICAL FIELD

The present application generally relates to liquid compositions containing urease inhibitors based on phosphoric triamide derivatives.

BACKGROUND

Urea constitutes about 45% of the worldwide consumption of nitrogen in agriculture and is the most widely used nitrogen fertilizer. However, after application to soil, urea partially hydrolyzes to ammonia and carbon dioxide, a process catalyzed by native bacterial and fungal ureases. These gaseous products volatilize to the atmosphere and, thus, a substantial amount of the total nitrogen applied to the field is lost.

Urease inhibitors applied together with urea may considerably decelerate this hydrolysis. Among the most effective urease inhibitors are the phosphoric triamide compounds as described in U.S. Pat. No. 4,530,714 (incorporated herein by reference), such as N-(n-butyl)thiophosphoric triamide (NBPT). Phosphoric triamides may also prevent the enzymatic cleavage of urea in animal wastes, thereby decreasing odor. Similarly, the urease inhibitors may mask animal urine odor, thus dissuading animals from undesired territorial behavior, including territorial marking with urine.

Industrial grade NBPT is a solid, waxy compound, which decomposes with moisture and at elevated temperatures. Direct application onto urea particles is very difficult. Thus, what is needed are NBPT solutions which have high solubility and stability of NBPT in the solvent, resistance of the NBPT solutions against crystallization at a low temperature, low viscosity at high concentrations, low toxicity, low volatility and flammability, minimal water content, and low cost.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Briefly, therefore, one aspect of the present disclosure encompasses a liquid composition, a dialkylcarbonate comprising the Formula ROC(=O)OR', wherein:
R and R' are independently alkyl or substituted alkyl, the substituted alkyl comprising one or more substitutions selected from the group consisting of alkyl, alkoxy, and hydroxyl; or
R and $R^1$ may together form a ring
one or more phosphoric triamide compounds comprising Formula (I):

wherein:
X is oxygen or sulfur;
$R^1$ is selected from the group consisting of alkyl, cycloalkenyl, alkenyl, alkynyl, aralkyl, aryl, and cycloalkyl;
$R^2$ is selected from the group consisting of hydrogen, alkyl, cycloalkenyl, alkenyl, alkynyl, aralkyl, aryl, and cycloalkyl;
$R^1$ and $R^2$ together may form an alkylene or alkenylene chain which may optionally include one or more heteroatoms of oxygen, nitrogen, or sulfur completing a 3, 4, 5, 6, 7, or 8 membered ring structure;
$R^3$, $R^4$, $R^5$, and $R^6$ are each independently selected from the group consisting of hydrogen and alkyl; and
$R^1$, $R^2$, $R^3$, $R^4$, $R^5$, and $R^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

Another aspect of the disclosure provides a liquid composition, comprising a $C_1$-$C_4$ alcohol, a vegetable oil or a petroleum distillate, a surfactant; and one or more phosphoric triamide compounds comprising Formula (I). Yet another aspect of the disclosure provides a liquid composition, comprising a $C_1$-$C_4$ alcohol, a petroleum distillate, a surfactant, and a urease-inhibiting effective amount of one or more phosphoric triamide compounds comprising Formula (I).

A further aspect of the present disclosure provides a method for treating a nitrogen-containing fertilizer, comprising contacting a nitrogen-containing fertilizer with a liquid composition. The liquid composition comprises a urease-inhibiting effective amount of one or more phosphoric triamide compounds comprising Formula (I); and a mixture selected from the group consisting of
(1) a mixture of glycol and dialkylcarbonate,
the glycol comprising Formula (IX), wherein $R^{13}$ is hydrogen or alkyl, $R^{14}$ is hydrogen or alkyl, and m is 1 to 4; and
the dialkylcarbonate comprising Formula ROC(=O)OR', wherein:
R and R' are independently alkyl or substituted alkyl, the substituted alkyl comprising one or more substitutions selected from the group consisting of alkyl, alkoxy, and hydroxyl; or
R and $R^1$ may together form a ring;
(2) a mixture of $C_1$-$C_4$ alcohol, a vegetable oil, and a surfactant; and
(3) a mixture of $C_1$-$C_4$ alcohol, a petroleum distillate, and a surfactant.

Other features and iterations of the disclosure are described in more detail below.

DETAILED DESCRIPTION

Disclosed herein are liquid compositions comprising one or more phosphoric triamide compounds, particularly NBPT. The present disclosure also provides methods for applying these liquid compositions to a nitrogen-containing fertilizer. In particular, the liquid compositions comprise a urease-inhibiting effective amount of at least one phosphoric triamide, so that the rate of urea volatization in a nitrogen-based fertilizer is forestalled or substantially retarded.

Additional embodiments and features are set forth in part in the description that follows, and in part will become apparent to those skilled in the art upon examination of the specification, or may be learned by the practice of the embodiments discussed herein. A further understanding of the nature and advantages of certain embodiments may be realized by reference to the remaining portions of the specification the drawings, the chemical structures, and descriptions, which forms a part of this disclosure. Any description of any R-group or chemical substituent, alone or in any combination, may be used in any chemical Formula described herein, and Formulae include all conformational and stereoisomers, including diastereomers, epimers, and enantiomers. Moreover any feature of a composition disclosed herein may be used in combination with any other feature of a composition disclosed herein.

(I) Liquid Compositions

One aspect of the present disclosure encompasses a liquid composition, comprising a dialkylcarbonate and one or more phosphoric triamide comprising Formula (I), shown below:

(I)

wherein
X is oxygen or sulfur;
$R^1$ is selected from the group consisting of alkyl, cycloalkenyl, alkenyl, alkynyl, aralkyl, and cycloalkyl;
$R^2$ is selected from the group consisting of hydrogen, alkyl, cycloalkenyl, alkenyl, alkynyl, aralkyl, and cycloalkyl;
$R^1$ and $R^2$ together may form an alkylene or alkenylene chain which may optionally include one or more heteroatoms of oxygen, nitrogen, or sulfur completing a 3, 4, 5, 6, 7, or 8 membered ring structure;
$R^3$, $R^4$, $R^5$, and $R^6$ are each independently selected from the group consisting of hydrogen and alkyl; and
$R^1$, $R^2$, $R^3$, $R^4$, $R^5$, and $R^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

Another aspect of the disclosure provides a liquid composition, comprising a $C_1$-$C_4$ alcohol, a vegetable oil, a surfactant, and a urease-inhibiting effective amount of one or more phosphoric triamide compounds comprising Formula (I). Yet another aspect of the disclosure provides a liquid composition, comprising a $C_1$-$C_4$ alcohol, a petroleum distillate, a surfactant, and a urease-inhibiting effective amount of one or more phosphoric triamide compounds comprising Formula (I).

"Liquid" refers to a solution, suspension, or an emulsion that is fluid under ambient conditions. Generally, the liquid compositions are liquid (as opposed to solid) from at least about −20° C. to at least about 60° C., such as from about 0° C. to about 40° C., or from about 10° C. to about 30° C.

In some embodiments, the liquid composition may comprise dimethylcarbonate, N-(n-butyl)thiophosphoric triamide (NBPT), and propylene glycol.

In other embodiments, the liquid composition may comprise 5-30% (w/w of the total composition) dimethylcarbonate, 10-40% (w/w of the total composition) NBPT, 40-85% (w/w of the total composition) propylene glycol, and 0-5% (w/w of the total composition) dye.

In still other embodiments, the liquid composition may comprise 0.1-5% (w/w of the total composition) dimethylcarbonate, 5-40% (w/w of the total composition) NBPT, 75-95% (w/w of the total composition) propylene glycol, 0-10% (w/w of the total composition) butoxyethanol, and 0-5% (w/w of the total composition) dye.

In yet other embodiments, the liquid composition may further comprise 5-30% (w/w of the total composition) ethyl lactate.

In still other embodiments, the liquid composition may comprise 5-30% (w/w of the total composition) $C_1$-$C_4$ alcohol, 20-50% (w/w of the total composition) vegetable oil, 50-75% (w/w of the total composition) surfactant, 5-40% (w/w of the total composition) NBPT, and 0-5% (w/w of the total composition) dye.

(a) Urease Inhibitors

The liquid compositions of the present disclosure comprise a urease-inhibiting effective amount of at least one phosphoric triamide. The phosphoric triamide may comprise a compound of Formula (I), as shown below:

wherein

X is oxygen or sulfur;

$R^1$ is selected from the group consisting of alkyl, cycloalkenyl, alkenyl, alkynyl, aralkyl, aryl, and cycloalkyl;

$R^2$ is selected from the group consisting of hydrogen, alkyl, cycloalkenyl, alkenyl, alkynyl, aralkyl, aryl, and cycloalkyl;

$R^1$ and $R^2$ together may form an alkylene or alkenylene chain which may optionally include one or more heteroatoms of oxygen, nitrogen, or sulfur completing a 3, 4, 5, 6, 7 or 8 membered ring structure;

$R^3$, $R^4$, $R^5$, and $R^6$ are each independently selected from the group consisting of hydrogen and alkyl; and $R^1$, $R^2$, $R^3$, $R^4$, $R^5$, and $R^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

In some embodiments X may be sulfur.

In other embodiments, $R^1$ may be alkyl, cycloalkyl, aryl, or substituted aryl. The substitution may be selected from the group consisting of $C_1$-$C_4$ alkyl, butyl, cyclohexyl, phenyl, and nitrophenyl.

In some embodiments, $R^1$ may be alkyl.

In yet other embodiments, $R^2$, $R^3$, $R^4$, $R^5$, and $R^6$ may each be hydrogen.

In particular embodiments, X may be sulfur, $R^1$ may be alkyl, and $R^2$, $R^3$, $R^4$, $R^5$, and $R^6$ may each be hydrogen.

In further embodiments, the phosphoric triamide comprising Formula I may be selected from the group consisting of N-(n-butyl) thiophosphoric triamide (NBPT), N-cyclohexyl thiophosphoric triamide, and N-(2-nitrophenyl) phosphoric triamide. In particular embodiments, the phosphoric triamide may be NBPT.

The amount of NBPT in the liquid composition may vary. In general, the weight percent of NBPT to the total composition may range from 1% to 40% (w/w). In various embodiments, the weight percent of NBPT to the total composition may be about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, or about 40% (w/w).

In one embodiment, the weight percent of NBPT in the total composition may be greater than 1% (w/w).

In some embodiments, the weight percent of NBPT in the total composition may be less than 40% (w/w).

In exemplary embodiments, the weight percent of NBPT in the total composition may range from about 5% to about 40% (w/w).

In other exemplary embodiments, the weight percent of NBPT in the total composition may range from about 10% to about 20% (w/w).

(b) Solvent

The liquid composition comprises at least one solvent.

In some embodiments, the liquid composition may comprise one or more organic solvents and/or petroleum distillates.

In one embodiment, the solvent may be a dialkylcarbonate, such as dimethylcarbonate (DMC).

In other embodiments, the solvent may be a combination of a lower alcohol and a vegetable oil.

In still other embodiments, the solvent may be a combination of a lower alcohol and a petroleum distillate.

The liquid composition may comprise further solvents, such as a glycol or a hydroxyl acid ester, such as ethyl lactate, or an additional polar or non-polar solvent.

(i) Organic Solvents

In one embodiment, the liquid composition may comprise one or more organic solvents.

In one embodiment, the organic solvents may be selected from the group consisting of:

(a) a compound comprising Formula (X)

wherein $R^{15}$ is hydrogen or alkyl;

$R^{16}$ is hydrogen or alkyl;

$R^{17}$ is hydrogen, =O, or alkyl;

$R^{18}$ is hydrogen, alkyl, or acyl; and m is 1 to 4;

wherein $R^{15}$ and $R^{16}$, or $R^{15}$ and $R^{18}$ may together form a ring comprising one or more oxygen atoms;

(b) dialkylcarbonate, comprising the Formula ROC(=O)OR', wherein:

R and R' are independently alkyl or substituted alkyl, the substituted alkyl comprising one or more substitutions selected from the group consisting of alkyl, alkoxy, and hydroxyl; or R and $R^1$ may together form a ring;

(c) $C_1$-$C_4$ alcohol;

(d) vegetable oil; and (e) esters of dicarboxyacids comprising Formula (VIII), wherein X is alkylene or alkenylene; and $R^{11}$ and $R^{12}$ are independently alkyl.

In some embodiments, the organic solvent selected from the group consisting of
(a) a compound comprising Formula (X)

wherein $R^{15}$ is hydrogen or alkyl;
$R^{16}$ is hydrogen or alkyl;
$R^{17}$ is hydrogen, =O, or alkyl;
$R^{18}$ is hydrogen, alkyl, or acyl; and
m is 1 to 4;
wherein $R^{15}$ and $R^{16}$, or $R^{15}$ and $R^{18}$ may together form a ring comprising one or more oxygen atoms; and
(b) esters of dicarboxyacids comprising Formula VIII, wherein X selected from the group consisting of alkylene and alkenylene; and $R^{11}$ and $R^{12}$ are independently alkyl.

In some embodiments, the organic solvent may comprise a compound comprising Formula (X)

wherein $R^{15}$ is hydrogen or alkyl;
$R^{16}$ is hydrogen or alkyl;
$R^{17}$ is hydrogen, =O, or alkyl;
$R^{18}$ is hydrogen, alkyl, or acyl; and
m is 1 to 4;
wherein $R^{15}$ and $R^{16}$, or $R^{15}$ and $R^{18}$ may together form a ring comprising one or more oxygen atoms.

In some embodiments, $R^{15}$ may be hydrogen.
In other embodiments, $R^{16}$ may be methyl. In still other embodiments, m may be 1.
In particular embodiments, $R^{15}$ may be hydrogen, $R^{16}$ may be methyl, and m may be 1.
In still other embodiments, $R^{15}$ may be butyl, $R^{16}$ may be hydrogen, and m may be 1.
In some embodiments, the organic solvent may comprise a compound of Formula (X), and the compound of Formula (X) may be a glycol comprising Formula (IX), wherein $R^{13}$ is hydrogen or alkyl;
$R^{14}$ is hydrogen or alkyl; and
m is 1 to 4.
In some embodiments, $R^{13}$ may be hydrogen.
In other embodiments, $R^{14}$ may be methyl. In still other embodiments, m may be 1.
In particular embodiments, $R^{13}$ may be hydrogen, $R^{14}$ may be methyl, and m may be 1.
In still other embodiments, $R^{13}$ may be butyl, $R^{14}$ may be hydrogen, and m may be 1.

Other suitable glycols include alkylene glycols, such as methanediol, 1,2-ethanediol (ethylene glycol), 1,2-propanediol (propylene glycol), 1,3-propanediol, 1,2-butanediol, 1,3-butanediol, 1,4-butanediol, and 1,5-pentanediol; or polyalkylene glycols, such as polyethylene glycol, for example di(ethylene glycol), tri(ethylene glycol), tetra(ethylene glycol), and hexa(ethylene glycol); or polypropylene glycol, for example di(propylene glycol), tri(propylene glycol), and tetra(propylene glycol). Optionally, the glycol may comprise a terminal alkoxyl group, such as methoxy, ethoxy, propoxy, or butoxy.

In exemplary embodiments, the glycol may be propylene glycol or butyoxyethanol.

The amount of glycol in the liquid composition may vary. In general, the weight percent of glycol to the total composition may range from 0% to 85% (w/w). In various embodiments, the weight percent of glycol to the total composition may be about 0%, about 5%, about 10%, about 15%, about 20%, about 25%, about 30%, about 35%, about 45%, about 50%, about 55%, about 60%, about 65%, about 70%, about 75%, about 80%, or about 85% (w/w).

In exemplary embodiments, the weight percent of glycol in the total composition may range from about 40% to about 85% (w/w).

In other exemplary embodiments, the weight percent of glycol in the total composition may range from about 50% to about 85% (w/w).

In one embodiment, the weight percent of glycol in the total composition is more than about 5% (w/w).

In one embodiment, the weight percent of glycol in the total composition is less than about 85% (w/w).

In still other exemplary embodiments, the weight percent of glycol in the total composition may range from about 75% to about 95% (w/w).

In particular embodiments, the glycol may be propylene glycol, butoxyethanol, or a mixture of propylene glycol and butoxyethanol. The amount of butoxyethanol in the liquid composition may vary. In general, the weight percent of butoxyethanol to the total composition may range from 0% to 10% (w/w).

In various embodiments, the weight percent of butoxyethanol to the total composition may be about 0%, about 1%, about 2%, about 3%, about 4%, about 5%, about 6%, about 7%, about 8%, about 9%, or about 10% (w/w).

In one embodiment, the liquid composition may comprise a compound of Formula (X), and the compound of Formula (X) is an ester of hydroxyacid comprising Formula (II), wherein $R^7$ is hydrogen or alkyl; and $R^8$ is alkyl.

In some embodiments, the ester of the hydroxyacid may be selected from the group consisting of methyl lactate, ethyl lactate, methyl glycolate, and ethyl glycolate.

In particular embodiments, the ester of the hydroxyacid may be ethyl lactate. Ethyl lactate is regarded as a "green" solvent and may be derived from renewable resources, such as corn.

In one embodiment, the liquid composition may comprise a compound of Formula (X), and the compound of Formula (X) is a heterocyclic alcohol comprising Formula (III), (III)

wherein n is 1 or 2; and
$R^9$ is hydrogen, alkyl, or acyl.

In one embodiment, the liquid composition may comprise a compound of Formula (X), and the compound of Formula (X) is a heterocyclic alcohol of Formulae (IV), (V), or (VI):

In some embodiments, the liquid composition may comprise a dialkylcarbonate. Dialkylcarbonates comprises the Formula ROC(=O)OR', wherein R and R' are independently alkyl or substituted alkyl, the substituted alkyl comprising one or more substitutions selected from the group consisting of alkyl, alkoxy, and hydroxyl; or R and $R^1$ may together form a ring. In one embodiment, the dialkylcarbonate does not comprise a ring structure. In some embodiments, the alkyl selected from the group consisting of methyl, ethyl, propyl, isopropyl, n-butyl, isobutyl, sec-butyl, and tert-butyl. In other embodiments, the alkyl is optionally substituted with one or more alkyl, alkoxyl, or hydroxy groups. Examples of suitable dialkylcarbonates include dimethylcarbonate, ethylmethylcarbonate, diethylcarbonate, ethylpropylcarbonate, methylpropylcarbonate, dipropylcarbonate, butylethylcarbonate, butylpropylcarbonate, butylmethylcarbonate, and dibutylcarbonate. In exemplary embodiments, the dialkylcarbonate may be dimethylcarbonate (DMC); that is, R and R' are both methyl.

DMC presents many advantages as a solvent. As a class of solvents, dialkylcarbonates are generally considered to be green solvents and are exempted from classification as volatile organic compounds (VOCs). DMC may hydrolyze under acidic or basic conditions to methanol and carbon dioxide. Under neutral conditions with suitable buffers, DMC may remain stable indefinitely.

In one embodiment, the liquid composition comprises a dialkylcarbonate, and the dialkylcarbonate may be a cyclic ester of carbonic acid comprising Formula (VII), wherein $R^{10}$ is hydrogen, alkyl, or hydroxyalkyl.

The amount of dialkylcarbonate in the liquid composition may vary. In general, the weight percent of dialkylcarbonate to the total composition may range from 0% to 30% (w/w).

In various embodiments, the weight percent of dialkylcarbonate to the total composition may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% (w/w).

In exemplary embodiments, the weight percent of dialkylcarbonate in the total composition may range from about 5% to about 30% (w/w).

In other exemplary embodiments, the weight percent of dialkylcarbonate in the total composition may range from about 0.1% to about 5% (w/w).

In one embodiment, the weight percent of dialkylcarbonate in the total composition is more than about 0.1% (w/w).

In one embodiment, the weight percent of dialkylcarbonate in the total composition is less than about 30% (w/w).

In some embodiments, the liquid composition may comprise a mixture of alcohol and vegetable oil. This system is relatively inexpensive. Also alcohols and the vegetable oils are plant-derived, green solvents attractive to farmers.

In various embodiments, the alcohol may be $C_1$-$C_4$ alcohol, such as methanol, ethanol, n-propanol, isopropanol, n-butanol, sec-butanol, isobutanol, and tert-butanol. In exemplary embodiments, the $C_1$-$C_4$ alcohol may be methanol or ethanol. The amount of alcohol in the liquid composition may vary. In general, the weight percent of alcohol to the total composition may range from 0% to 30% (w/w).

In various embodiments, the weight percent of alcohol to the total composition may be about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30% (w/w).

In exemplary embodiments, the weight percent of alcohol in the total composition may range from about 5% to about 30% (w/w).

In one embodiment, the weight percent of alcohol in the total composition is more than about 0.1% (w/w).

In one embodiment, the weight percent of alcohol in the total composition is less than about 30% (w/w).

In some embodiments, the organic solvent comprises a vegetable oil. Suitable vegetable oils include, for example, castor oil, coconut oil, corn oil, cottonseed oil, olive oil, palm oil, peanut oil, rapeseed oil, safflower oil, sesame oil, soybean oil, sunflower oil, mustard oil, almond oil, beech oil, cashew oil, hazelnut oil, macadamia oil, mongongo oil (manketti oil), pecan oil, pine nut oil, pistachio oil, walnut oil, grapefruit seed oil, lemon oil, orange oil, bitter gourd oil, bottle gourd oil, buffalo gourd oil, butternut squash seed oil, egusi seed oil, pumpkin seed oil, watermelon seed oil, acai oil, black seed oil, blackcurrant seed oil, borage seed oil, evening primrose oil, flaxseed oil, amaranth oil, apricot oil, apple seed oil argan oil, avocado oil, babassu oil, ben oil, borneo tallow nut oil, cape chestnut oil, carod pod oil, cocoa butter, cocklebur oil, cohune oil, coriander seed oil, date seed oil, dika oil, false flax oil, grape seed oil, hemp oil, kapok seed oil, kenaf seed oil, lallemantia oil, mafura oil, marula oil, meadowfoam seed oil, niger seed oil, nutmeg butter, okra seed oil, papaya seed oil, perilla seed oil, persimmon seed oil, pequi oil, pili nut oil, pomegranate seed oil, poppyseed oil, prune kernel oil, quinoa oil, ramtil oil, rice bran oil, royle oil, sacha inchi oil, spaote oil, seje oil, shea butter, taramira oil, tea seed oil, thisle oil, tigernut oil, tobacco seed oil, tomato seed oil, and wheat germ oil.

In exemplary embodiments, the vegetable oil may be selected from the group consisting of castor oil, corn oil, peanut oil, rapeseed oil, soybean oil, and sunflower seed oil.

In exemplary embodiments, the vegetable oil may comprise one or more selected from the group consisting of castor oil, corn oil, peanut oil, rapeseed oil, soybean oil, and sunflower seed oil.

The amount of vegetable oil in the liquid composition may vary. In general, the weight percent of vegetable oil to the total composition may range from 0% to 70% (w/w).

In various embodiments, the weight percent of vegetable oil to the total composition may be about 5%, about 10%, about 15%, about 20%, about 25%, about 30%, about 35%, about 40%, about 45%, about 50%, about 55%, about 60%, about 65%, or about 70% (w/w).

In exemplary embodiments, the weight percent of vegetable oil in the total composition may range from about 40% to about 70% (w/w).

In other exemplary embodiments, the weight percent of vegetable oil in the total composition may range from about 20% to about 50% (w/w).

In one embodiment, the weight percent of vegetable oil in the total composition is more than about 5% (w/w).

In one embodiment, the weight percent of vegetable oil in the total composition is less than about 70% (w/w).

Optionally, when the vegetable oil is a solid at a temperature below 25° C., the liquid composition may further comprise a sufficient amount of petroleum distillates to keep the vegetable oil fluid. A liquid composition comprising an alcohol and a vegetable oil may also further comprise ethyl lactate and/or propylene glycol.

Esters of dicarboxyacids may comprise Formula (VIII), as shown below:

(VIII)

wherein X selected from the group consisting of alkylene and alkenylene, and $R^{11}$ and $R^{12}$ are independently alkyl.

The liquid composition may comprise other solvents in addition to those described above. For example, the solvent may be a polar protic solvent, a polar aprotic solvent, a nonpolar organic solvent, or combinations thereof. Non-limiting examples of suitable polar protic solvents include alcohols, such as methanol, ethanol, isopropanol, n-propanol, isobutanol, n-butanol, sec-butanol, tert-butanol, and combinations thereof. Non-limiting examples of suitable aprotic solvents include acetone, acetonitrile, diethoxymethane, N,N-dimethylformamide (DMF), dimethyl sulfoxide (DMSO), N,N-dimethylpropanamide (or dimethylpropionamide; DMP), 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMA), N-methyl-2-pyrrolidinone (NMP), 1,4-dioxane, ethyl formate, formamide, hexachloroacetone, hexamethylphosphoramide, methyl acetate, N-methylacetamide, N-methylformamide, methylene chloride, methoxyethane, morpholine, nitrobenzene, nitromethane, propionitrile, pyridine, sulfolane, tetramethylurea, tetrahydrofuran (THF), 2-methyl tetrahydrofuran, tetrahydropyran (THP), trichloromethane, and combinations thereof. Representative nonpolar solvents include, but are not limited to, alkane and substituted alkane solvents (including cycloalkanes), aromatic hydrocarbons, esters, ethers, ketones, and combinations thereof. Specific nonpolar solvents that may be employed include, for example, benzene, butyl acetate, t-butyl methylether, t-butyl methylketone, chlorobenzene, chloroform, cyclohexane, dichloromethane, dichloroethane, diethyl ether, ethyl acetate, fluorobenzene, heptane, hexanes, methyl ethylketone (2-butanone), methyl isobutyl ketone, pentyl acetate, propyl acetates, toluene, and combinations thereof.

In exemplary embodiments, the additional solvent may comprise ethyl acetate.

The amount of the additional solvent in the liquid composition may vary. In general, the weight percent of the additional solvent to the total composition may range from 0% to 85% (w/w).

In various embodiments, the weight percent of the additional solvent to the total composition may be about 0%, about 5%, about 10%, about 15%, about 20%, about 25%, about 30%, about 35%, about 45%, about 50%, about 55%, about 60%, about 65%, about 70%, about 75%, about 80%, or about 85%.

In exemplary embodiments, the weight percent of the additional solvent in the total composition may range from about 40% to about 85% (w/w).

In other exemplary embodiments, the weight percent of the additional solvent in the total composition may range from about 5% to about 50% (w/w).

In one embodiment, the weight percent of additional solvent in the total composition is more than about 5% (w/w).

In one embodiment, the weight percent of additional solvent in the total composition is less than about 85% (w/w).

(ii) Petroleum Distillates

In some embodiments, the liquid composition comprises a petroleum distillate. Suitable petroleum distillates include, for example, pentanes, hexanes, heptanes, octanes, petroleum ether (pet. ether), ligroin, light petroleum distillates, medium petroleum distillates, and heavy petroleum distillates. In some embodiments, the petroleum distillates may be hydrotreated to increase the proportion of saturation within the petroleum distillates.

The amount of petroleum distillates in the liquid composition may vary. In general, the weight percent of petroleum distillates to the total composition may range from 0% to 70% (w/w).

In various embodiments, the weight percent of petroleum distillates to the total composition may be about 5%, about 10%, about 15%, about 20%, about 25%, about 30%, about 35%, about 40%, about 45%, about 50%, about 55%, about 60%, about 65%, or about 70% (w/w).

In exemplary embodiments, the weight percent of petroleum distillates in the total composition may range from about 10% to about 30% (w/w).

In one embodiment, the weight percent of petroleum distillates in the total composition is more than about 5% (w/w).

In one embodiment, the weight percent of petroleum distillates in the total composition is less than about 70% (w/w).

(c) Further Components

In various embodiments, the liquid composition may comprise further components, such as dyes, surfactants, polysaccharides, and calcium sources.

(i) Dyes

Optionally, the composition may further comprise a dye, pigment, pigment dispersion, lake pigment, color additive, and the like. The dye may serve at least two purposes: to show that a nitrogen-containing fertilizer has been adequately covered with a compound of Formula (I), and to aid the user in seeing that nitrogen-containing fertilizer has been applied to the field.

In particular embodiments, the dye may be selected to show coverage of the liquid composition.

In some embodiments, the dye may be an industrial grade or an FD&C grade dye.

In exemplary embodiments, the dye may be a phthalo blue dye.

The amount of dye in the liquid composition may vary. In general, the weight percent of dye to the total composition may range from 0% to 5% (w/w).

In various embodiments, the weight percent of dye to the total composition may be about 1%, about 2%, about 3%, about 4%, or about 5%.

In exemplary embodiments, the weight percent of dye in the total composition may range from about 2% to about 3% (w/w).

In one embodiment, the weight percent of dye in the total composition is more than about 1% (w/w).

In one embodiment, the weight percent of dye in the total composition is less than about 5% (w/w).

(ii) Surfactants

In some embodiments, the liquid composition may comprise a surfactant, which may improve the stability of emulsions formed between other components in the liquid composition, increase wettability of the liquid composition on a nitrogen-containing fertilizer, or inhibit unwanted microbial growth in the liquid composition.

In various embodiments, the surfactant may be a alkylaryl polyether alcohol, such as Triton™ X-100, Surfonic™ N-100 (nonoxynol-10), Witconol™ NP-100, Tergitol™ NP-9, or Tergitol™ NP-6; or a poloxamer, such as Pluronic™, Synperonic™, or Kolliphor™. Other suitable examples of surfactants include, for example, Walwet CM, 2-acrylamido-2-methylpropane sulfonic acid, alkyl polyglycoside, ammonium perfluorononanoate, benzalkonium chloride (BAC), benzethonium chloride (BZT), 5-bromo-5-nitro-1,3-dioxane, cetyl trimethylammonium bromide (CTAB, hexadecyltrimethylammonium bromide, cetyl trimethylammonium chloride), cetylpyridinium chloride (CPC), cyclohexyl-1-hexyl-maltopyranoside, decylmaltopyranoside, decyl polyglucose, dimethyldioctadecylammonium chloride, dioctadecyldimethylammonium bromide (DODAB), dipalmitoylphosphatidylcholine, lauryldimethylamine oxide, dodecylmaltopyranoside, magnesium laureth sulfate, polyethoxylated tallow amine (POEA), octenidine dihydrochloride, octylphenoxypolyethoxyethanol (Igepal™ CA-630), octylthioglucopyranoside (OTG), ox gall, sodium nonanoyloxybenzensulfonate, sorbitan monolaurate, surfactin, and thonozonium bromide.

In some embodiments, the surfactant may be decaglyceryl monooleate, such as Caprol™ from Abitec.

In particular embodiments, the liquid composition may comprise an alcohol, a vegetable oil, and a surfactant.

In other embodiments, the liquid composition may comprise an alcohol, a petroleum distillate, and a surfactant.

The amount of surfactant in the liquid composition may vary. In general, the weight percent of surfactant to the total composition may range from 0% to 75% (w/w). In various embodiments, the weight percent of surfactant to the total composition may be about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, or about 75% (w/w).

In exemplary embodiments, the weight percent of surfactant in the total composition may range from about 1% to about 5% (w/w).

In other exemplary embodiments, the weight percent of surfactant in the total composition may range from about 50% to about 75% (w/w).

In one embodiment, the weight percent of surfactant in the total composition is more than about 1% (w/w).

In one embodiment, the weight percent of surfactant in the total composition is less than about 75% (w/w).

(iii) Polysaccharide

Polysaccharide may be included in the liquid composition, providing increased flowability. The amount of polysaccharide in the liquid composition may vary. In general, the weight percent of polysaccharide to the total composition may range from 0% to 10% (w/w).

In various embodiments, the weight percent of polysaccharide to the total composition may be about 1%, about 2%, about 3%, about 4%, about 5%, about 6%, about 7%, about 8%, about 9%, or about 10%.

In exemplary embodiments, the weight percent of polysaccharide in the total composition may range from about 1% to about 5% (w/w).

In one embodiment, the weight percent of polysaccharide in the total composition is more than about 1% (w/w).

In one embodiment, the weight percent of polysaccharide in the total composition is less than about 10% (w/w).

(iv) Other Ingredients

Other ingredients may be included in the liquid composition, providing for example increased flowability and crop yields. Examples of other ingredients include nitrification inhibitors, calcium sources, sulfur, zinc, copper, and the like.

The amount of other ingredients, such as a calcium source, in the liquid composition may vary. In general, the weight percent of other ingredients to the total composition may range from 0% to 10% (w/w).

In various embodiments, the weight percent of other ingredients to the total composition may be about 1%, about 2%, about 3%, about 4%, about 5%, about 6%, about 7%, about 8%, about 9%, or about 10%.

In exemplary embodiments, the weight percent of other ingredients in the total composition may range from about 1% to about 5% (w/w).

In one embodiment, the weight percent of other ingredients in the total composition is more than about 1% (w/w).

In one embodiment, the weight percent of other ingredients in the total composition is less than about 10% (w/w).

(d) Forming the Composition

The compositions may be formed by adding the components in any order. The components may be mixed under ambient conditions or at an elevated temperature, so long as the temperature is low enough to avoid decomposition of the constituents. The mixing may occur, for example, but stirring, blending, shaking, or rotating the constituents in a mixing device. The mixing may occur over the course of a few minutes to several hours, such as overnight.

(II) Methods of Use

The present disclosure also provides a method for treating a nitrogen-containing fertilizer. The method comprises contacting a nitrogen-containing fertilizer with a liquid composition contact with a urease-inhibiting effective amount of a liquid composition. The liquid composition comprises any liquid composition described above in Section (I).

The liquid composition may be added to any nitrogen-containing fertilizer, such as a urea-containing fertilizer. When the urea-containing fertilizer is solid, the liquid composition may be added to the mixture during or after manufacture.

In another embodiment, the urea-containing fertilizer may be liquid, such as liquid urea (UAN), in which case the liquid composition may be mixed with the liquid fertilizer. To blend a urea-containing fertilizer with a liquid composition, the urea-containing fertilizer is weighed and transferred into the mixing equipment. Next, the selected amount of liquid composition is applied to the urea-containing fertilizer in the mixing equipment. The mixture may be blended well before introducing other fertilizer materials, allowing adequate time for uniform coverage.

In some embodiments, a dye may be included in the product view the uniformity of coverage. Under certain temperature and humidity conditions, the treated urea-containing fertilizer may stick together. Other fertilizer materials added to the mixture, such as potash, may eliminate the need of a drying agent. If the particles remain sticky, small amounts of finely ground, highly absorbent, free-flowing powders, such as attapulgite clays, may be added at concentrations as low as 0.25% by weight of the treated urea.

To blend a urea-containing fertilizer with a liquid composition an accurate scale may be used to weigh materials. A fertilizer blender or other equipment may be used to roll or blend the urea-containing fertilizer with the liquid composition. A rotary device may tumble the urea-containing fertilizer and allow for uniform contact with the liquid composition without spillage. Auger and paddle mixers may also be used. Exposed inner surfaces of the mixing equipment may be clean, dry, and rust-free.

The urea-containing fertilizer may be spread across the top of the soil using a spreader truck or an airflow truck. When liquid composition is added to a liquid nitrogen-containing fertilizer, the mixture may be sprayed onto the fields. The fertilizer containing the liquid composition may be used for any nitrogen-consuming plants including, for example, row crops, specialty crops, pastures, sod farms, turfgrass, ornamentals, and other landscape or nursery plantings. The liquid composition may be used with urea-containing fertilizers applied to the surface during pre-plant, pre-emergence, sidedress, top-dress, broadcast, or other post-planting applications. Without wishing to be bound by theory, the liquid composition beneficially retards the hydrolysis of urea, controls fertilizer volatility, and prevents ammonia loss while the urea is on the soil surface.

One of skill in the art would recognize that the rate of application for urea-containing fertilizers and the liquid compositions is affected by many environmental factors, many of which contribute to fertilizer volatilization. Without wishing to be bound by theory, the factors increasing volatilization that should be considered when choosing the appropriate rate include high soil moisture; drying conditions including low humidity, sun and wind; high air and soil temperatures; high soil pH; low organic matter content in the soil; low cation-exchange capacity (CEC) soil; high amounts of crop residue; and the length of control needed.

In other embodiments, the composition may be added to fertilizers and wastes of animal origin, such as excrement or manure, to decrease nitrogen loss and odor formation.

In still other embodiments, the liquid composition may also be added into sprays that mask animal urine odors.

Definitions

The compounds described herein may have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups:

hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

When introducing elements of the present disclosure or the embodiments(s) thereof, the articles "a," "an," "the," and "said" are intended to mean that there are one or more of the elements. The terms "comprising," "including," and "having" are intended to be inclusive and mean that there may be additional elements other than the listed elements.

Having described the disclosure in detail, it will be apparent that modifications and variations are possible without departing from the scope of the disclosure defined in the appended claims.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure, therefore all matter set forth is to be interpreted as illustrative and not in a limiting sense.

Example 1—Formulations of NBPT in Dimethylcarbonate (DMC)

Liquid compositions were prepared by mixing NBPT with dimethylcarbonate (DMC), propylene glycol, a pigment, and, optionally, ethyl lactate or butoxyethanol. Flammable liquids have a flashpoint below 100° F., and combustible liquids have a flashpoint between 100° F. and 200° F. By keeping the ethyl lactate to 10 wt. % or less, the flashpoint for the liquid compositions was just above 200° F., so it is not categorized as combustible. This feature is particularly advantageous in view of the notorious nature of nitrogen-based fertilizer's explosiveness. The blue pigment formulation used was WB 18151 Phthalo Blue RS supplied by Eagle Specialty (St. Louis, Mo.).

TABLE 1

List of Formulations

| Formulation | NBPT* | Dimethyl carbonate | Propylene glycol | Ethyl lactate | 2-Butoxy ethanol | Pigment |
|---|---|---|---|---|---|---|
| 1 | 10% | 5% | 83% | — | — | 2% |
| 2 | 20% | 10% | 68% | — | — | 2% |
| 3 | 20% | 5% | 68% | 5% | — | 2% |
| 4 | 20% | 5% | 68% | — | 5% | 2% |

*All percentages are listed as w/w of the total composition.

To evaluate the effectiveness of Formulations 1 and 2 as urease inhibitors, the liquid compositions were compared to Agrotain Ultra™ and untreated urea in a volatilization test. For this test, 30 g of soil (Dundee silt loam) was applied to the bottom of a diffusion jar (wide-mouthed Mason jar). Water was added to bring the soil moisture to approximately 35% (w/w). The nitrogen-based fertilizer mixtures ("nitrogen source") were applied to the damp soil at the rate of approximately 180 mg: Urea (46% N), Agrotain Ultra™ (3 quart/ton), AGX1A (Formulation 1 applied at 3 quarts/ton of urea), and AGX1B (Formulation 2 applied at 3 quarts/ton of urea). Three separate jars were prepared for each nitrogen source. A boric acid trap was placed at the top of each jar. On each titration date, the boric acid was removed from the trap, diluted with 5 mL water, and titrated with 0.01 M sulfuric acid until the appropriate color change occurred, thus measuring the ammonia absorbed from volatilization. Ammonia loss was reported as the percentage of the total nitrogen applied to the soil.

Figure 1:
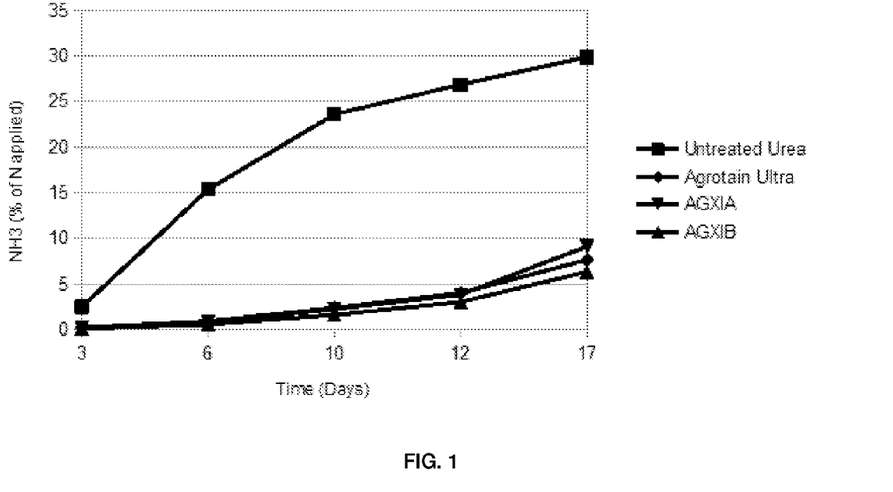
FIG. 1 depicts the cumulative ammonia loss for nitrogen fertilizers: urea without NBPT, Agrotain Ultra™, and solid urea treated liquid compositions comprising DMC, propylene glycol, and NBPT with 10 wt. % NBTP (AGXIA) and with 20 wt. % NBPT (AGXIB).

Table 2 shows the responses of nitrogen sources and rates over the five titration dates. FIG. 1 depicts the cumulative ammonia loss for nitrogen fertilizers: urea without NBPT, Agrotain Ultra™, AGXIA, and AGXIB. The cumulative ammonia loss was 29.8% with untreated urea compared to a range of 6.3% to 9.1% when the various sources of NBPT were used. For short time frames (0-10 days) the Agrotain Ultra™, AGXIA, and AGXIB formulations performed about the same, but for longer time frames (>10 days), it appeared that AGXIB slightly outperformed Agrotain Ultra™, resulting in less ammonia volatilization compared to the other nitrogen sources. Considering the least significant difference (LSD), however, a difference of at least 0.93 was not observed among samples at the same time points. Thus, one cannot assume that differences in test data related only to the treatment and not to other factors. As such, the three nitrogen sources containing a urease inhibitor (Agrotain Ultra™, AGXIA, and AGXIB) performed statistically the same. Note also that the present example tested the mechanism of ammonia loss and does not mimic the exact environmental conditions of the field.

TABLE 2

Cumulative ammonia loss for the nitrogen sources.

| Nitrogen Source | Days after Application | | | | |
|---|---|---|---|---|---|
| | 3 | 6 | 10 | 12 | 17 |
| Urea | 2.47* | 15.34 | 23.56 | 26.84 | 29.84 |
| Agrotain Ultra ™ | 0.23 | 0.9 | 2.37 | 4.00 | 7.63 |
| AGXIA | 0.19 | 0.78 | 2.25 | 3.83 | 9.10 |
| AGXIB | 0.12 | 0.57 | 1.61 | 3.02 | 6.33 |

*Cumulative ammonia lost was calculated as a weight percentage of the total nitrogen applied to the sample. Each sample type was prepared in triplicate (N = 3). The limit significant difference (LSD) in these measurements was 0.93.

Example 2—Formulations of NBPT in Alcohol and Surfactant

Further liquid formulations were formed by mixing NBPT in alcohol with at least one surfactant and either a petroleum distillate (Sasol 210) or a vegetable oil (soybean oil). These formulations are shown below at Table 3.

TABLE 3

List of Formulations

| Formulation | NBPT* | MeOH | EtOH | NP-9 | NP-6 | Sasol 210 | Soybean Oil | Walwet CM |
|---|---|---|---|---|---|---|---|---|
| P10 | 10.1% | 16.4% | — | 29.7% | — | 15.3% | — | 28.5% |
| S10 | 11.8% | 18.8% | — | 11.9% | 26.1% | — | 19.6% | 11.8% |
| 5 | 11.5% | — | 5.7% | 57.7% | — | 21.5% | — | 3.6% |

Tergitol™ NP-9 is a nonylphenol polyethoxylate nonionic surfactant produced by the Dow Chemical Company with a hydrophilic-lipophilic balance (HLB) of 12.9, a pH of 6 in 1% aqueous solution, a viscosity of 243 cP at 25° C., and a density of 1.055 g/mL at 20° C. Tergitol™ NP-6 is a nonylphenol polyethoxylate nonionic surfactant produced by the Dow Chemical Company with an HLB of 10.9, pH of 7.3 in 5% aqueous solution, a density of 1.039 g/mL at 25° C. Sasol 210 is a hydrotreated light petroleum distillate with an average flashpoint of 109° C. by ASTM D 93 and an autoignition temperature of 216° C. Walwet CM is a polyethoxylene non-ionic surfactant. Formulations P10 and S10 are both considered to be flammable because of their methanol concentrations.

Figure 2:
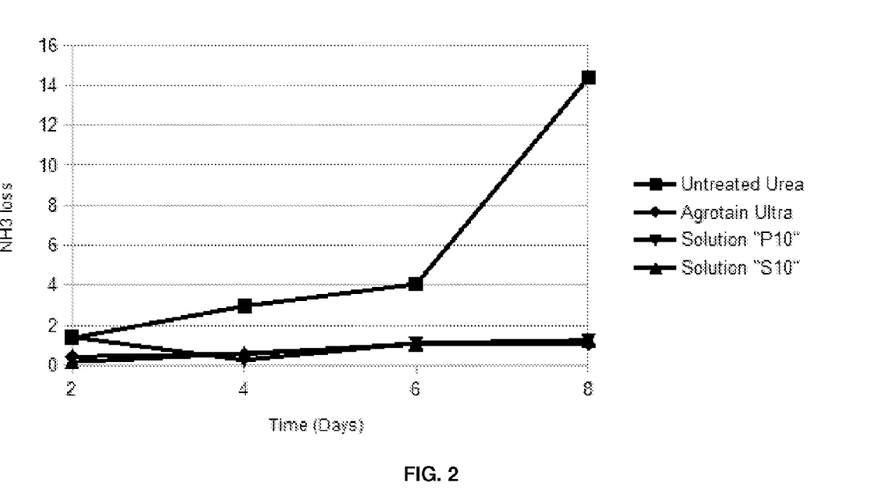
FIG. 2 depicts the cumulative ammonia loss for nitrogen fertilizers: urea without NBPT, Agrotain Ultra™, solid urea treated with a liquid composition comprising methanol, petroleum distillates, surfactant, and 10 wt. % NBTP (P10), and solid urea treated with a liquid composition comprising methanol, soybean oil, surfactant, and NBPT with 10 wt. % NBTP (S10).

Table 4 shows the responses of nitrogen sources and rates over the five titration dates. FIG. 2 depicts the cumulative ammonia loss for nitrogen fertilizers: urea without NBPT, Agrotain Ultra™, P10, and S10.

TABLE 4

Cumulative ammonia loss for the nitrogen sources.

| Nitrogen Source | Days after Application | | | |
|---|---|---|---|---|
| | 2 | 4 | 6 | 8 |
| Urea | 1.35 a | 2.95 a | 4.05 a | 14.35 a |
| Agrotain Ultra ™ | 0.43 b | 0.55 b | 1.08 b | 1.05 b |
| P10 | 1.4 a | 0.25 b | 1.1 b | 1.23 b |
| S10 | 0.15 c | 0.58 b | 1.05 b | 1.23 b |

* Means followed by the same letter do no significantly differ (p = 0.05 LSD).

What is claimed is:
1. A liquid composition, comprising:
a dialkylcarbonate comprising the Formula ROC(=O)OR', wherein: R and R' are independently selected from the group consisting of methyl, ethyl, propyl, and butyl; and
one or more phosphoric triamide compounds comprising Formula (I):

wherein:
X is oxygen or sulfur;
$R^1$ is selected from the group consisting of alkyl, cycloalkenyl, alkenyl, alkynyl, aralkyl, aryl, and cycloalkyl;
$R^2$ is selected from the group consisting of hydrogen, alkyl, cycloalkenyl, alkenyl, alkynyl, aralkyl, aryl, and cycloalkyl;
$R^1$ and $R^2$ together may form an alkylene or alkenylene chain which may optionally include one or more heteroatoms of oxygen, nitrogen, or sulfur completing a 3, 4, 5, 6, 7, or 8 membered ring structure;
$R^3$, $R^4$, $R^5$, and $R^6$ are each independently selected from the group consisting of hydrogen and alkyl; and
$R^1$, $R^2$, $R^3$, $R^4$, $R^5$, and $R^6$, when not hydrogen, may each be optionally substituted with one or more selected from the group consisting of trihalomethyl, naphthoxy, alkyl, halogen, arylmercapto, phenoxy, phenyl, nitro, cyano, amino, alkylamino, dialkylamino, alkoxy, mercapto, alkylmercapto, alkylcarbonyl, arylamino, arylcarbonyl, alkoxycarbonyl, carboxy, diarylamino, and carbonamide.

2. The liquid composition of claim 1, wherein R and R' are both methyl.

3. The liquid composition of claim 1, further comprising one or more organic solvents selected from the group consisting of

(a) a compound comprising Formula (X)

(X)

wherein:
R$^{15}$ is hydrogen or alkyl;
R$^{16}$ is hydrogen or alkyl;
R$^{17}$ is hydrogen, =O, or alkyl;
R$^{18}$ is hydrogen, alkyl, or acyl; and
m is 1 to 4; or
wherein R$^{15}$ and R$^{16}$, or R$^{15}$ and R$^{18}$ may together form a ring comprising one or more oxygen atoms; and

(b) esters of dicarboxyacids comprising Formula VIII, (VIII)

wherein:
X selected from the group consisting of alkylene and alkenylene; and
R$^{11}$ and R$^{12}$ are independently alkyl.

4. The liquid composition of claim 3, wherein the liquid composition comprises a compound of Formula (X), and the compound of Formula (X) is an ester of hydroxyacid comprising Formula (II),

(II)

wherein:
R$^{7}$ is hydrogen or alkyl; and
R$^{8}$ is alkyl.

5. The liquid composition of claim 4, wherein the ester of the hydroxyacid is selected from the group consisting of methyl lactate, ethyl lactate, methyl glycolate, and ethyl glycolate.

6. The liquid composition of claim 5, wherein the ester of the hydroxyacid is ethyl lactate.

7. The liquid composition of claim 3, wherein the liquid composition comprises a compound of Formula (X), and the compound of Formula (X) is a glycol comprising Formula (IX), (IX)

wherein:
R$^{13}$ is hydrogen or alkyl;
R$^{14}$ is hydrogen or alkyl; and
m is 1 to 4.

8. The liquid composition of claim 7, wherein the glycol is selected from propylene glycol, butoxyethanol, and combinations thereof.

9. The liquid composition of claim 3, wherein the liquid composition comprises a compound of Formula (X), and the compound of Formula (X) is a heterocyclic alcohol comprising Formula (III),

(III)

wherein:
n is 1 or 2; and
R$^{9}$ is hydrogen, alkyl, or acyl.

10. The liquid composition of claim 3, wherein the liquid composition comprises a compound of Formula (X), and the compound of Formula (X) is a heterocyclic alcohol of Formulae (IV), (V), or (VI):

(IV)

(V)

(VI)

11. The liquid composition of claim 1, wherein the phosphoric triamide is N-(n-butyl)thiophosphoric triamide (NBPT).

12. The liquid composition of claim 1, comprising:
dimethylcarbonate;
N-(n-butyl)thiophosphoric triamide (NBPT); and
propylene glycol.

13. The liquid composition of claim 12, comprising:
0.1-5% (w/w of the total composition) dimethylcarbonate;
5-40% (w/w of the total composition) NBPT;
75-95% (w/w of the total composition) propylene glycol;
0-10% w/w of the total composition) butoxyethanol; and
0-5% (w/w of the total composition) dye.

14. The liquid composition of claim 13, further comprising 5-30% (w/w of the total composition) ethyl lactate.

* * * * *